(12) United States Patent
Ilesic

(10) Patent No.: US 6,273,475 B1
(45) Date of Patent: Aug. 14, 2001

(54) PIPE COUPLING

(76) Inventor: Peter Ilesic, ul, Pohorskega Bataljona 38, 2000 Maribor (SI)

( * ) Notice: Subject to any disclaimer, the term of this patent is extended or adjusted under 35 U.S.C. 154(b) by 0 days.

(21) Appl. No.: 09/180,540
(22) PCT Filed: May 6, 1997
(86) PCT No.: PCT/IB97/00503
  § 371 Date: May 20, 1999
  § 102(e) Date: May 20, 1999
(87) PCT Pub. No.: WO97/43571
  PCT Pub. Date: Nov. 20, 1997

(30) Foreign Application Priority Data

May 10, 1996 (DE) .......................................... 296 08 499 U

(51) Int. Cl.[7] ................................................. F16L 17/025
(52) U.S. Cl. ........................... 285/105; 285/112; 285/340
(58) Field of Search .................................... 285/105, 106, 285/112, 340, 345, 346, 902

(56) References Cited

U.S. PATENT DOCUMENTS

| | | | |
|---|---|---|---|
| 2,202,492 | * | 5/1940 | Jacocks ................................ 285/340 |
| 2,459,608 | * | 1/1949 | Wolfram .............................. 285/340 |
| 2,846,240 | * | 8/1958 | Beyer ................................ 285/105 X |
| 3,319,508 | * | 5/1967 | McCormick ...................... 285/340 X |
| 3,545,794 | * | 12/1970 | Wise ..................................... 285/340 |
| 3,985,379 | * | 10/1976 | Normark ............................. 285/340 |
| 4,500,117 | * | 2/1985 | Ayers et al. ...................... 285/340 X |
| 4,664,422 | | 5/1987 | Straub . |
| 5,310,223 | | 5/1994 | Straub . |
| 5,639,102 | | 6/1997 | Ilesic . |

FOREIGN PATENT DOCUMENTS

| | | | |
|---|---|---|---|
| 676875 | 3/1991 | (CH) . | |
| 24 28 101 | 1/1975 | (DE) . | |
| 2854868 | * | 7/1980 | (DE) ................................... 285/105 |
| 44 08 743 | 6/1995 | (DE) . | |
| 211 158 | 2/1987 | (EP) . | |
| 551 582 | 7/1993 | (EP) . | |
| 667 476 | 8/1995 | (EP) . | |
| 1034687 | * | 6/1966 | (GB) ................................... 285/340 |
| 1 462 886 | 1/1977 | (GB) . | |
| 96/07046 | 3/1996 | (WO) . | |

\* cited by examiner

*Primary Examiner*—Teri Pham Luu
(74) *Attorney, Agent, or Firm*—Pillsbury Winthrop LLP

(57) ABSTRACT

A pipe coupling has an elastomer packing collar (5) arranged in a closable housing (4) with radial end walls (14) and comprising two axially spaced apart ring-shaped beads (6) which project radially inwards and sealingly lie against a pipe (1, 2). Each ring-shaped bead (6) subdivided into two adjacent radial beads (8, 9) by a ring-shaped gap (7) oriented at an acute angle to the longitudinal axis of the pipe coupling. This gap (7) forms at the outer radial bead (9) a sharp-cornered packing lip (10). The ring-shaped gap (7) may be closed by pressing together and elastically deforming the two adjacent radial beads (8, 9). Each front side (11) of the packing collar (5) is inclined inwards towards the longitudinal axis of the pipe coupling. A conical clamping ring (13) with a subdivided circumference, axially and radially supported on the housing (4), lies against the front side (11) of the packing collar (5). When the housing (4) is narrowed and closed and the packing collar (5) is clamped, the clamping ring (13) lies on the corresponding pipe (1 or 2) of the piping. The inwardly inclined front side (11) may be substantially designed as an inner cone (12) and the clamping ring (13) may have a rounded inner edge (20).

5 Claims, 2 Drawing Sheets

PIPE COUPLING

This application is the national phase of international application PCT/IB97/00503 filed May 6, 1997 which designated the U.S.

From DE 44 08 743 C2 a sealing device for pipelines that is usable as a pipe coupling is known. An elastomeric sealing sleeve is received in a closable housing adapted to be tightened on a pipeline. At its front sides the housing has radially inwardly directed end or terminal walls against which the plane front sides of the sealing sleeves bear. When the housing and the sealing sleeve are closed and narrowingly tightened on the pipes of a pipeline a gap usually remains between the terminal walls of the housing and the respective pipe wall. Through this gap contamination may obtain access to the elastomeric sealing sleeve, and the sleeve may be exposed to UV irradiation, ozone or other detrimental external attack, which may lead to a deterioration of the elastomeric material properties and to leaks.

From EP 0 551 582 A1 a pipe coupling has become known which has a housing that is adapted to be narrowed during closing and has disposed therein an elastomeric sealing sleeve with one sealing lip for being urged against each respective outer pipe wall by a lock washer. Each front side of the sealing sleeve is divided into oppositely inclined conical faces embraced by a supporting ring of V-shaped cross-section. A clamping ring has its outer edge supported in the inside of a bend formed by a housing end wall and a housing outer wall. In the inner edge region the clamping ring has a plurality of lamellae formed by slit-like recesses. The clamping ring bears against the inner flank of the supporting ring with this lamellar region. When the housing of the pipe coupling is closed and narrowed, the end edges of these lamellae bite into the pipe ends to be joined. With this pipe coupling the supporting ring with the special double cone shaping of the front side of the sealing sleeve is necessary in order to prevent the elastomeric material of the sealing sleeve from flowing away through the recesses between the lamellae of the clamping ring.

Finally, from CH-A-676 875 a clamping sleeve arrangement with a packing collar disposed in a housing has become known. The packing collar has a central abutment bead, against both sides of which the ends of two pipes to be joined bear. Two sealing edges are provided on each of the two axial ends of the packing collar for lying against the respective pipe circumference. On both front sides of the packing collar lies an anchoring or clamping ring which is formed in the shape of a hollow cone and is supported outside the housing on the bend of an end flange. When the housing is tightened, the inner edge of the anchoring ring engages with the entire outer circumference of the pipes and bites into this. Thereby the pipe ends are held axially against the abutting bead by form-locking. For this purpose the inner edge of the anchoring or clamping rings may be designed to be concave, so that a cutting edge formed thereby digs into the outer surface of the pipes.

The invention is based on the object of improving a pipe coupling having the features of simplicity of design, functionality, and universal usability.

Advantageous further developments of the invention are indicated by the dependent claims.

By means of the conical clamping ring that bears against the bevelled front side, preferably formed as an inner cone, of the packing collar and is supported on the housing, protection of the packing collar from detrimental environmental attack penetrating from the outside is provided when the housing is closed and tightened on a pipeline. The clamping ring can compensate a variously sized gap that may be present between the housing and the pipe surface depending upon the size or diameter of the pipe coupling and the pipes to be coupled.

Preferably two variants of the clamping ring can be used with the pipe coupling. In the first variant the inner edge of the clamping ring is rounded, so that in the tightened operational position on a pipeline the clamping ring can slide on the surface of the pipes to be joined. Thus, axial movements of the two pipes relative to each other may be compensated, because the sealing sleeve too permits a certain axial movement by a corresponding elastic deformation. In the second variant the clamping ring is formed with a sharp inner edge, so that it makes a joint of axially fixed position by its engagement with the pipe surface. The two oppositely directed clamping rings of a pipe coupling thus make possible a force-locked coupling connection of the two pipes. The engagement with the pipe can be improved even more by notches on the sharp inner edge of the clamping ring.

Because of the possibility of alternative use of the two different clamping rings, the pipe coupling having an identical housing and an identical sealing sleeve can be employed for different coupling purposes, so that less stock-keeping of single components results as a logistic advantage.

In the following the invention will be set out in greater detail with the aid of examples of embodiment with reference to drawings. Shown by FIG. 1 is a schematic simplified partial sectional view of a pipe coupling having a first example of embodiment of a clamping ring with an opened, not tightened housing;

Figure 1:
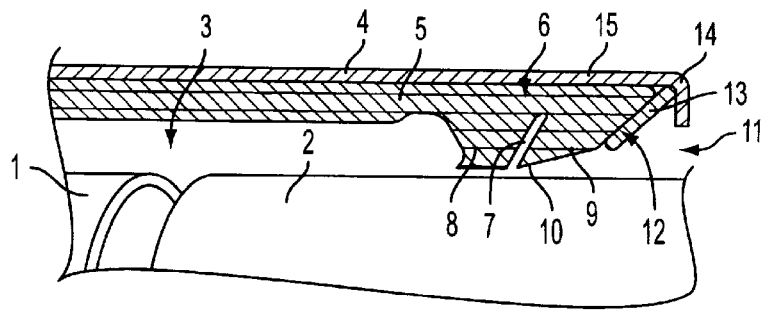
Figure 2:
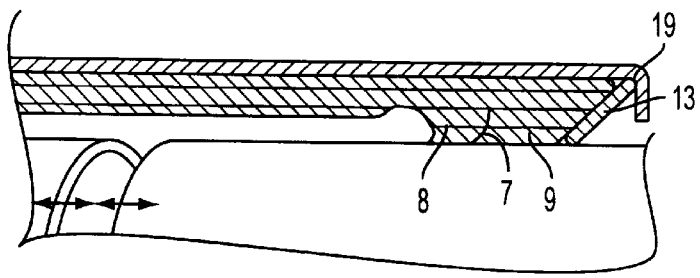
FIG. 2 is a view corresponding to FIG. 1 of the pipe coupling with a closed housing and a packing collar pressed against a pipeline.
Figure 3:
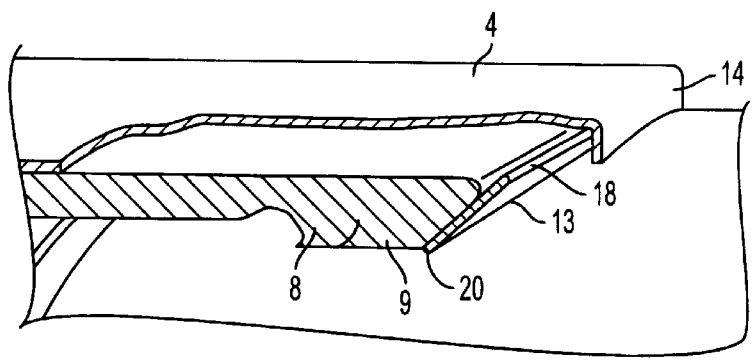
FIG. 3 is a perspective plan cutaway view of the pipe coupling.

The pipe coupling with an elastomeric packing collar shown in FIGS. 1 to 3 and 6 to 8 substantially corresponds to the sealing device described in DE 44 08 743 C2, the contents of which are incorporated into the present application by express reference. Therefore, in the following only those elements of the pipe coupling which are essential for the understanding of the present invention will be dealt with.

For connecting and sealing two pipes 1 and 2 of a pipeline, the pipe coupling is disposed to be approximately centered on the position of a joint 3 of the two pipe ends (the left hand portion of the pipe coupling, having a mirror-image symmetrical configuration, is not shown). A packing collar 5 of elastomeric material is disposed in a housing 4 and has a ring-shaped bead 6 on each of its two axial end regions.

The housing 4 is provided with a closure means (not shown), so that it may be closed and therewith narrowed at the intended position of the pipe coupling or pipe joint 3, wherein the packing collar 5 is pressed with its two ring-shaped beads 6 radially against the respective pipes 1 or 2. Each ring-shaped bead 6 is subdivided into two adjacent radial beads 8, 9 by a ring-shaped gap 7 inclined to the longitudinal axis of the pipe coupling, wherein the outer radial bead 9 forms an acute-angled inwardly directed packing lip 10.

Figure 4:
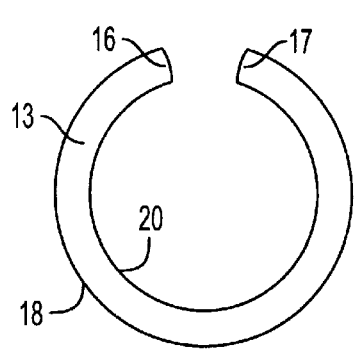
FIG. 4 is a plan view of the clamping ring according to the invention.
Figure 5:
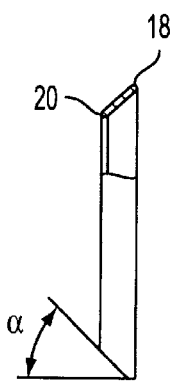
FIG. 5 is a partly sectional side view of the clamping ring of FIG. 4.
Figure 6:
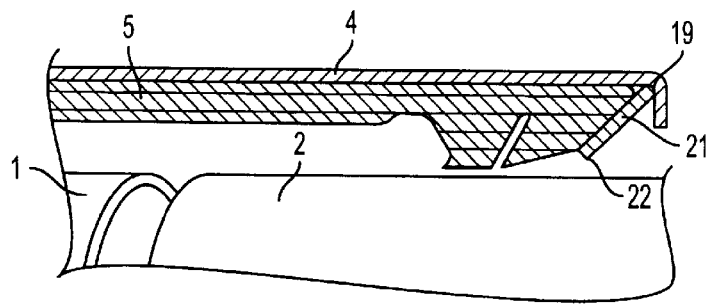
FIG. 6 is a schematic simplified partial sectional view of a pipe coupling having a second example of embodiment of the clamping ring with an opened, not tightened housing.

Each axial front side 11 of the packing collar 5 is conically inclined inwards towards the longitudinal axis of the pipe coupling. Lying against this conical ring-shaped surface 12 is a clamping ring 13 of spring steel or similar material, said clamping ring being inserted between the packing collar 5 and a radial end wall 14 of the housing 4 and supported axially and radially on the inside portion 19 of a bend formed by the cylindrical housing portion 15 and the end wall 14. However, the clamping ring 13 can also be supported on a ring-shaped bulge or a groove on the housing 4. The clamping ring 13 is divided along its circumference (see FIG. 4). Its two ends 16, 17 may be disposed to overlap or to be spaced from each other in such manner that they almost touch each other when the housing 4 is tightened. The clamping ring 13 has a cone angle a that is suitably about 45° (see FIG. 5), but may also be chosen to be greater or smaller. The angle of the conical ring-shaped surface 12 of the packing collar 5 is suitably of comparable size. However, the ring-shaped surface 12 need not be strictly conical. It may also be curved inwardly, wherein the elastic material of the packing collar 5 nevertheless bears against the clamping ring 13.

The outer edge 18 of the clamping ring 13 is rounded, as seen in longitudinal cross-section, and conformed to the inside portion 19 of the bend of the housing 4. The inner edge 20 of the clamping ring 13 is also rounded, so that when the housing 4 and the packing collar 5 are tightened and radially narrowed, the inner edge 20 of the clamping ring 13 tightly lies on outer side of the respective pipes 1 or 2. Thereby it is ensured that neither contamination nor other undesired or harmful environmental attack such as that of UV radiation or ozone have access to the packing collar 5. In this case the clamping ring 13 functions as a protective ring. During an axial movement of one or both of the pipes 1, 2, the clamping ring 13 can slide on the pipe or pipes whilst maintaining its sealing action. Therefore the pipe coupling can also be utilized as a length compensator. Furthermore, in the condition of being tightened on a pipeline, the clamping ring 13 exerts pressure in axial direction on the outer radial bead 9 and prevents the elastomeric material from flowing away through the gap between the end wall 14 of the housing 4 and the respective pipe 1 or 2 throughout the lifetime of the packing collar 5.

Figure 7:
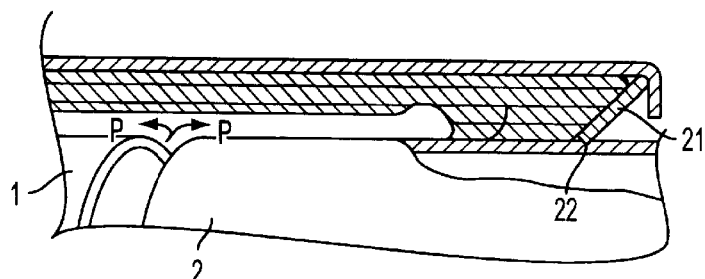
FIG. 7 is a view corresponding to FIG. 6 of the pipe coupling with a closed housing and a packing collar pressed to a pipeline.
Figure 8:
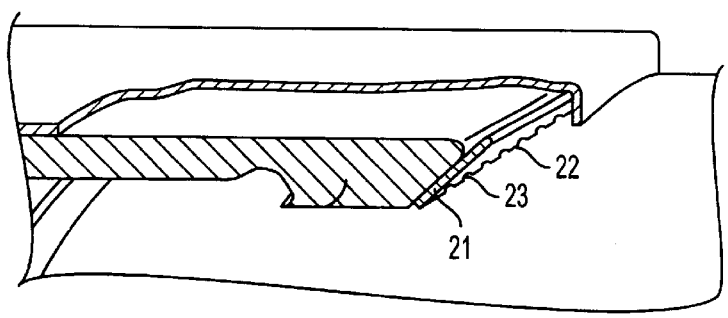
FIG. 8 is a perspective plan cutaway view of the pipe coupling according to FIG. 7.
Figure 9:
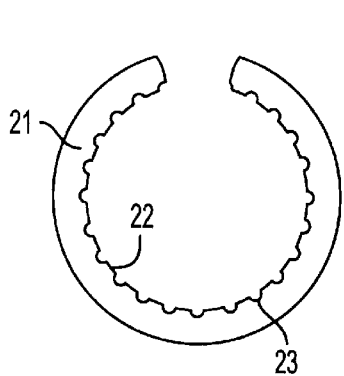
FIG. 9 is a plan view of the clamping ring of the invention according to the second example of embodiment.
Figure 10:
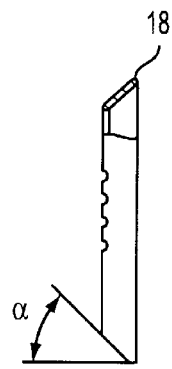
FIG. 10 is a partly sectional side view of the clamping ring of FIG. 9.

The example of embodiment of the pipe coupling according to the invention shown in FIGS. 6 to 10 differs from the above-described pipe coupling by the use of a clamping ring 21, the inner edge 22 of which is formed to be sharp and can press and bite into the pipe surface when the pipe coupling is tightened (see FIG. 7). Contrary to the preceding example, the clamping ring 21 is thereby fixed in axial position on the pipe, so that this pipe coupling prevents relative axial movements of the two pipes 1 and 2. This sealing effect is maintained even during a dynamic change of the inner pressure p (see FIG. 7). Furthermore, the clamping ring 21 may have a plurality of notches 23 spaced from each other along the inner periphery of its inner edge 22 (see FIG. 8 to 10), by means of which the ability of the clamping ring 21 to grip the pipe surface firmly is further improved. However, the notches 23 are formed to be comparatively small, so that the clamping ring 21 may nevertheless fulfil its function of protecting from contamination and attack from the outside.

Because both of the two clamping rings 13 and 21 are otherwise designed in the same way, the pipe coupling may fulfil different pipe coupling functions with the identical housing and the identical sealing sleeve by way of choice or exchange of the clamping rings 13 or 21, so that this utilization of the same parts results in reduced stockkeeping (logistic advantage).

What is claimed is:

1. A pipe coupling with an elastomeric packing collar disposed in a closable housing with radial end walls and having two ring-shaped beads axially spaced apart and projecting radially inwards for sealingly lying against a pipeline, wherein a continuous annular cavity is present between the two ring-shaped beads, wherein each ring-shaped bead is subdivided into two adjacent radial beads by a ring-shaped gap disposed at an acute angle to the longitudinal axis of the pipe coupling, and an acute-angled packing lip is formed by this gap on the outer radial bead, and wherein the ring-shaped gap may be pressed together by elastic deformation of the two adjacent radial beads, and wherein each front side of the packing collar is inclined inwards towards the longitudinal axis of the pipe coupling, and has lying against it a conical clamping ring that is subdivided at its circumference and is supported axially and radially on the housing and lies on the respective pipe of the pipeline when the housing is narrowed and closed and the packing collar is tightened, wherein the clamping ring has a rounded inner edge, and wherein after the closable housing is closed, said clamping ring remains in a conical shape, is urged by radial compressive forces against the outer surface of the pipe, and slides on the pipe.

2. A pipe coupling according to claim 1, wherein the inwardly inclined front side is substantially designed as an inner cone.

3. A pipe coupling according to claim 1 or 2, wherein the clamping ring has a cone angle α of about 45°.

4. A pipe coupling according to claim 1 or 2, wherein the clamping ring has a rounded outer edge.

5. A pipe coupling according to claim 4, wherein the clamping ring is made of spring steel.

* * * * *